United States Patent [19]

Sato

[11] Patent Number: 4,700,201
[45] Date of Patent: Oct. 13, 1987

[54] DOT CORRECTED LASER PRINTER
[75] Inventor: Kei Sato, Yokohama, Japan
[73] Assignee: Ricoh Company, Ltd., Tokyo, Japan
[21] Appl. No.: 831,096
[22] Filed: Feb. 19, 1986
[30] Foreign Application Priority Data Feb. 28, 1985 [JP] Japan .................................. 60-39894

[51] Int. Cl.$^4$ ........................ G01D 15/00; H04N 1/40
[52] U.S. Cl. ................................ 346/108; 346/76 L;
346/160; 358/283; 358/298
[58] Field of Search ...................... 346/76 L, 168, 160;
358/283, 298

[56] References Cited

U.S. PATENT DOCUMENTS 4,460,909 7/1984 Bassetti et al. ...................... 346/160
4,553,173 11/1985 Kawamura ........................... 358/283
4,578,689 3/1986 Spencer et al. ...................... 346/160

Primary Examiner—E. A. Goldberg
Assistant Examiner—Gerald E. Preston
Attorney, Agent, or Firm—Mason, Fenwick & Lawrence

[57] ABSTRACT

To provide a smooth representation in half-tones of a record, the area of a dot recorded by a laser printer is controlled. Binary image information which is applied to the laser printer is examined to determine if it is isolated when it is to be recorded "black". When the laser printer is operated in the background exposure scheme, the off time of the laser which records an isolated "black" is increased whereas when the laser printer is operated in the image exposure scheme, the on time of the laser which records an isolated "black" is reduced. The control of the recorded area per dot is disclosed for one dimension array (in the direction of main scan X) and two dimension array (in the directions of main scan X and subscan Y). Also, the recorded area per dot can be controlled by controlling the transmission of laser beam through an AO modulator in a manner corresponding to the detection of the isolation.

32 Claims, 24 Drawing Figures

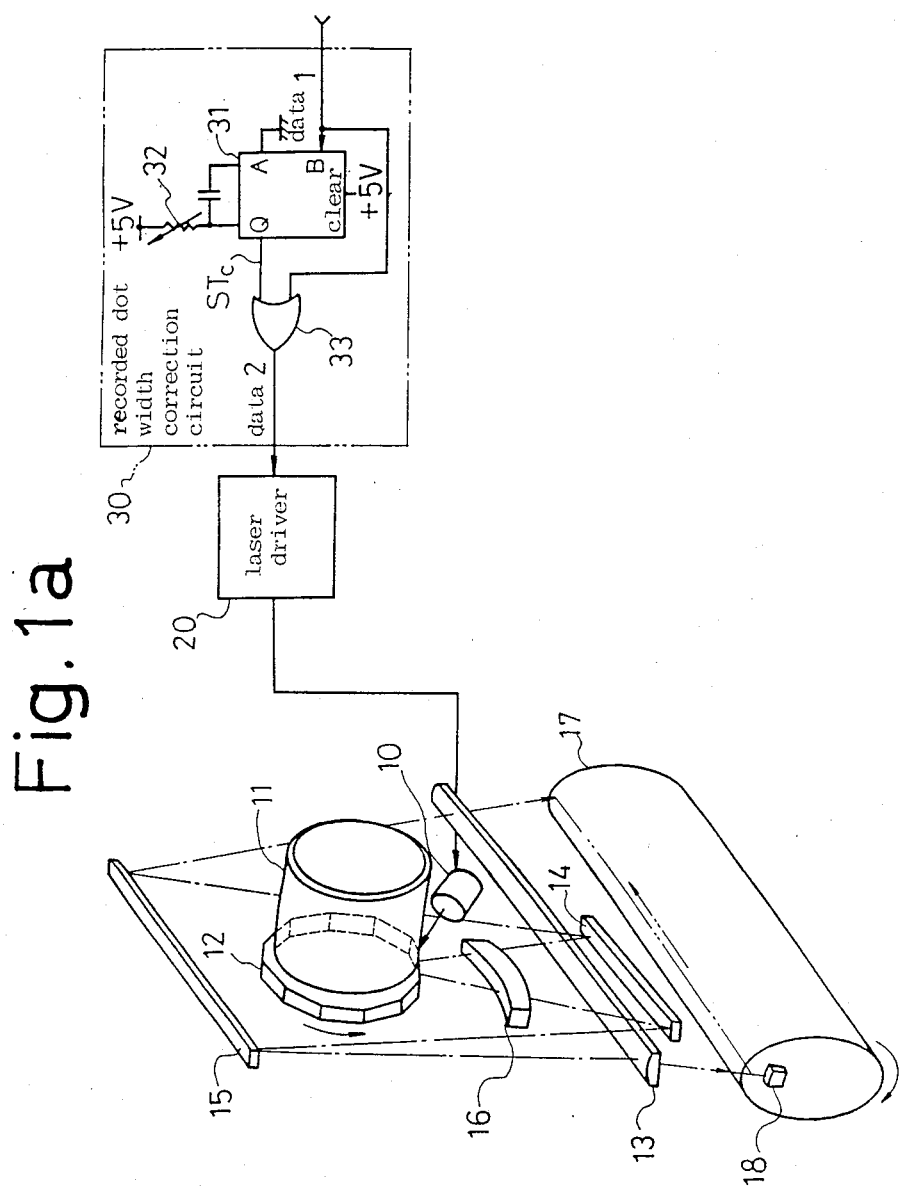

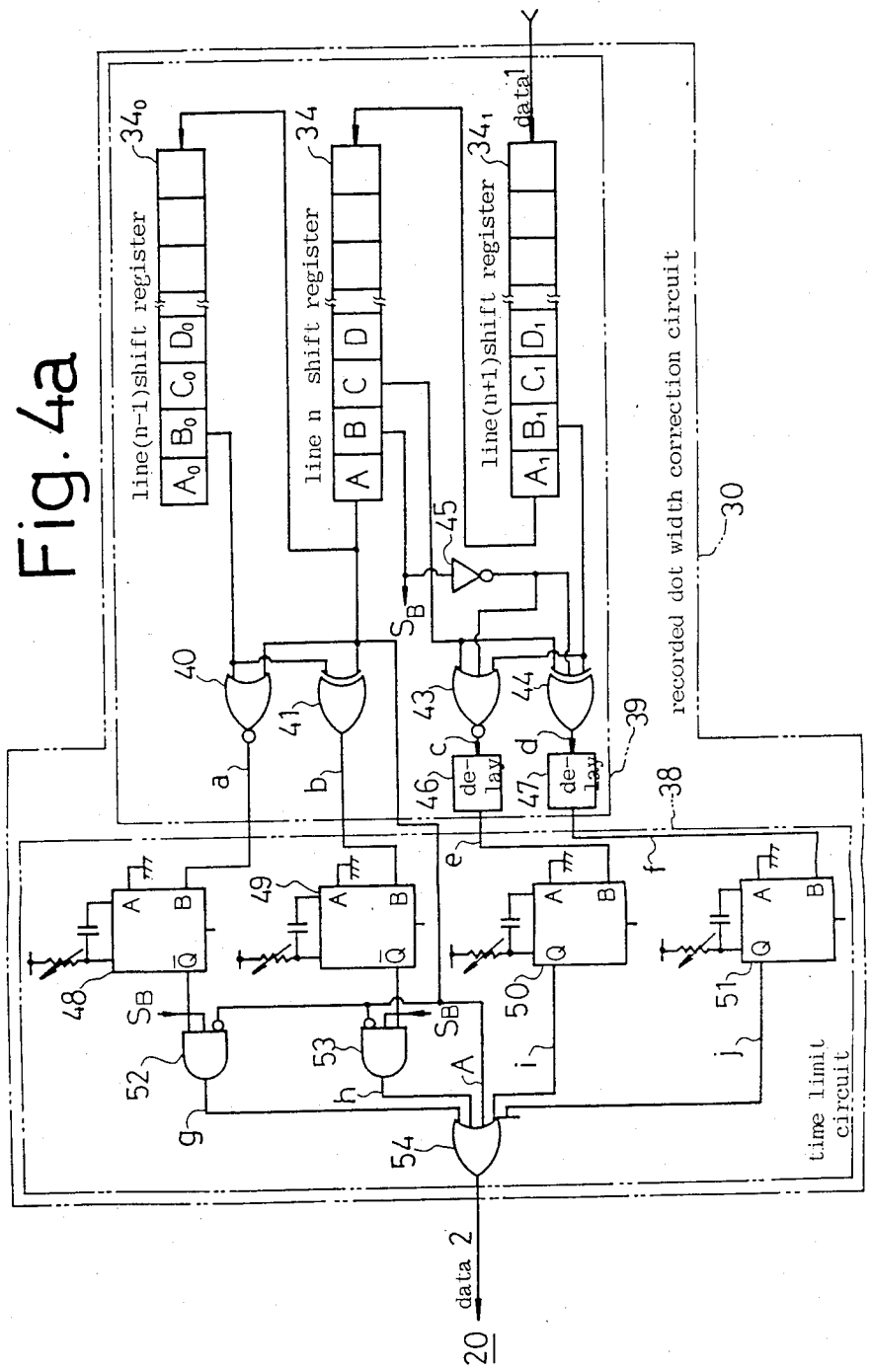

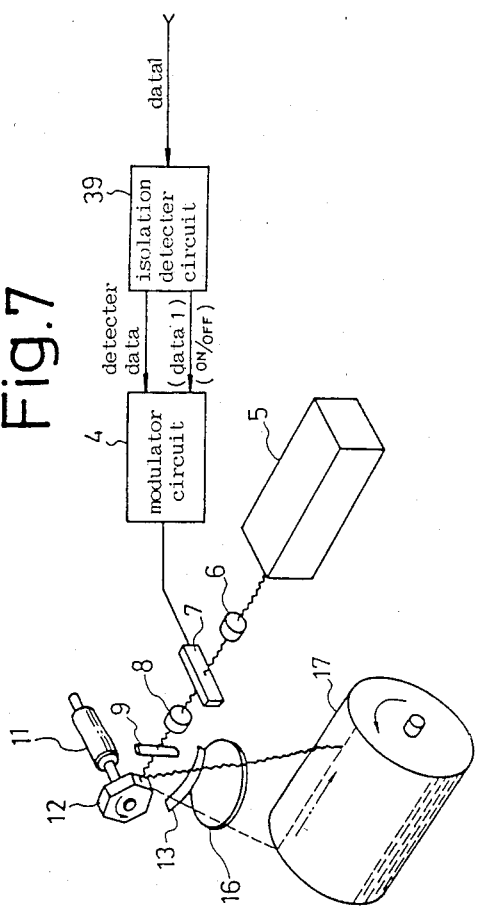
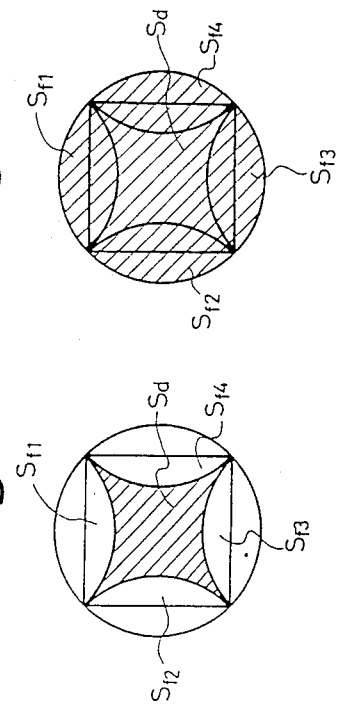

DOT CORRECTED LASER PRINTER

TECHNICAL FIELD

The invention relates to a laser printer, in particular, to the control of a recording density in a laser printer.

PRIOR ART

The arrangement of a laser printer which is typical in the prior art is schematically shown in FIG. 7. In this Figure, a laser 5 emits a laser beam which passes through a beam compressor 6, A0 modulator 7, a beam expander 8 and a cylindrical lens 9 to impinge upon a rotating multi-facet mirror 12. The multi-facet mirror 12 is driven for rotation at a uniform rate by means of a motor 11. Laser beam reflected by the multi-facet mirror passes through a toroidal lens 13 and an f-θ lens 16 to irradiate a drum 17 formed of a photosensitive material. As the multi-facet mirror 12 rotates, the laser beam repeatedly traverses along the axis of the drum 17 to scan the surface of the drum 17 (main scan X). It will be appreciated that the drum 17 is driven for rotation at a uniform rate (subscan Y).

While not shown, the surface of the drum 17 is uniformly charged by means of a charger, and the charged surface is scanned by the laser beam in the manner mentioned above. During one line scanning in which the laser beam traverses from one end to the other end of the drum 17, the laser beam is modulated spotwise by means of the A0 modulator in an on- and off-manner corresponding to a binary signal to be recorded. As a consequence, an electrostatic latent image is formed on the surface of the drum 17 in a manner corresponding to binary information, and the latent image is developed by a developing unit to provide a visual toner image, which is then transferred onto a record paper.

Binary information has a correspondence to a position in the directions of the main scan X and the subscan Y (or a point in the two dimensional coordinate system or a picture element). In a background exposure scheme where a white background is exposed to laser beam while areas representing an image are not exposed so that a toner may be applied to the image subsequently, dots recorded will be generally configured as indicated by hatching lines in FIGS. 9a to 9e. In actuality, dots formed by continuous exposure and not recorded (shown in solid line) do not assume a circular configuration, but represent a line having a width corresponding to the diameter of a circle and which is continuous in the direction of main scan X. Consequently, recorded dots (shown hatched) in FIGS. 9a to 9e have a side which adjoins with a white dot (shown by a solid line circle) which is represented by a straight line parallel to the direction X. In other words, the dot will be slightly less in area than that shown by hatched lines.

Generally, when a single dot is recorded in an isolated manner, its four sides will be surrounded by white dots, as shown in FIG. 9a, and hence the area Sd of the recorded single dot is very small.

When two dots are recorded in succession, an overlapping area Sf between black dots are recorded as black, whereby the recorded area of the two dots will be equal to $2Sd + Sf$. Accordingly, the recorded area per dot will be $Sd + \frac{1}{2} Sf$, thus slightly greater than that mentioned initially.

Similarly, when three dots are recorded as indicated in FIG. 9c, the total area of the three dots will be $3Sd + 2Sf$, and thus the area per dot will be $Sd + \frac{2}{3} Sf$, representing a further greater recorded area. When four dots are recorded as indicated in FIG. 9d, the total area of the four dots will be equal to $4Sd + 3Sf$, and the area per dot will be $Sd + \frac{3}{4} Sf$, producing an increased recorded area. When five dots are recorded as indicated in FIG. 9e, the total area of the five dots will be $5Sd + 4Sf$, and hence the area per dot will be $Sd + 4/5 Sf$, which has been increased furthermore.

It will be seen from the foregoing description that considering a single recorded dot, the area of the recorded dot in question will vary depending on whether adjacent dots are or are not black.

Representing the single dot area Sd which is produced when the single dot is recorded in an isolated manner as shown in FIG. 9a, as one unit, it will be seen that the recorded area should ideally increase as indicated by a phantom line curve shown in FIG. 9f as the number of adjacent black dots increases. However, as mentioned previously, the area per dot increases depending on the number of adjacent black dots, so that the recorded area as a function of the number of adjaceant black dots will be as indicated by a solid line curve in FIG. 9f where such recorded area increases beyond the proportional relationship with respect to the number of adjacent black dots. In other words, the recorded density will increase. Accordingly, a print which is defined by an isolated single dot tends to disappear, and an oblique line or diagonal defined by the single dot width tend to fade out, thus degrading the print quality. When a halftone is to be represented in terms of the number of recorded picture elements for a given area which corresponds to a given number of picture elements, it is difficult to produce a smooth halftone.

In an image exposure scheme where the white background of an image remains unexposed while an image area is exposed to laser radiation and the image is then developed with a toner, the dots recorded will be generally configured as indicated by hatching lines shown in FIGS. 10a to 10e. Actually, continuously exposed or recorded dots (shown in solid line circles, as hatched) do not appear as circular, but represent a line having a width corresponding to the diameter of the circle and which is continuous in the direction of main scan X. Thus, they will be slightly greater than the area shown.

Generally, when a single dot is recorded in an isolated manner, it is configured substantially circular as shown in FIG. 10a, and has a maximum area Sd per dot recorded. When only two dots are recorded in succession, an area of overlap Sf between black dots are shared by the two dots, so that the total area of the two dots recorded will be equal to $2Sd - Sf$, and thus the area per dot recorded will be $Sd - \frac{1}{2} Sf$, thus representing a slight reduction in the recorded area. Similarly, when three dots are recorded as indicated in FIG. 10c, the total area of the three dots will be $3Sd - 2Sf$, and the area per dot will be $Sd - \frac{2}{3} Sf$, representing a further reduction in the area recorded. When four dots are recorded as shown in FIG. 10d, the total area of the four dots will be equal to $4Sd - 3Sf$, and thus the area per dot will be $Sd - \frac{3}{4} Sf$, representing an even greater reduction in the area recorded. Where five dots are recorded as shown in FIG. 10e, the total area of the five dots will be equal to $5Sd - 4Sf$, and the area per dot will be $Sd - 4/5 Sf$, representing a further reduction in the area recorded. It will be seen that considering the area of a single dot recorded, such recorded dot area depends on whether adjacent dots are or are not black.

Assuming that the area Sd per dot which is obtained when a single dot is recorded in an isolated manner as shown in FIG. 10a represents one unit, it will be seen that the recorded area should ideally increase with the number of adjacent black dots as indicated by phantom lines shown in FIG. 10f. However, the area per dot reduces as a function of the number of adjacent black dots in the manner mentioned above. The recorded area actually reduces from its proportional relationship with respect to the number of black dots, as the number of adjacent black dots increases, in a manner indicated by a solid line curve in FIG. 10f. It will thus be seen that the recording density changes. Again there arises a problem that it is difficult to achieve a smooth halftone representation.

SUMMARY OF THE INVENTION

It is an object of the invention to reduce a change in a recording density per picture element recorded which would result from the correlation between a picture element being recorded and adjacent picture elements which may or may not be recorded.

To achieve the above object, in accordance with the invention, there is provided means for correcting the amount of laser beam to which a picture element in question is exposed, in a manner depending on the correlation between the picture element in question or being recorded and adjacent picture elements which may or may not be recorded. To explain this for the background exposure scheme mentioned above, when a picture element in question is surrounded by a reduced number of adjacent black picture elements recorded or by an increased number of adjacent white picture elements, the dot for that picture element is recorded to a greater extent or the amount of laser beam which forms the adjacent white picture elements is reduced. On the contrary, in the image exposure scheme, when a picture element in question is surrounded by a reduced number of adjacent black picture elements or by an increased number of adjacent white picture elements, that dot is recorded to a lesser extent or the amount of laser beam which forms the black picture elements is reduced. In one embodiment, this can be accomplished by controlling the amount of laser beam in terms of a time interval allocated to a picture element (during which it remains non-irradiated in the background exposure scheme and is irradiated in the image exposure scheme). In another embodiment, the amount of laser beam is controlled by the level of emission from AO modulation. With this arrangement, the dot which is highly isolated has a greater recorded area or a greater recording density in the background exposure scheme. Alternatively, in the image exposure scheme, a dot which is less isolated has a greater recorded area or a recording density. In this manner, there is obtained a record with a high reproducibility of an image and with a smooth halftone representation.

Other objects and features of the invention will become apparent from the following description with reference to the drawings.

BRIEF DESCRIPTION OF THE DRAWINGS

FIG. 1a is a block diagram of essential parts of one embodiment of the invention;

FIG. 1b graphically shows a series of timing charts which indicate input and output signals of a recorded dot width correction circuit shown in FIG. 1a;

FIG. 4a is a block diagram of essential parts of yet another embodiment of the invention;

FIG. 5b graphically shows a series of timing charts of input and output signals of the arrangement shown in FIG. 5a;

FIG. 7 is a block diagram of essential parts of a still further embodiment of the invention;

FIG. 8a is an enlarged plan view of a single isolated dot recorded which is obtained with a laser printer of background exposure scheme;

FIG. 8b is an enlarged plan view of a single isolated dot recorded which is obtained with a laser printer of image exposure scheme;

DESCRIPTION OF PREFERRED EMBODIMENTS

Figure 1B:
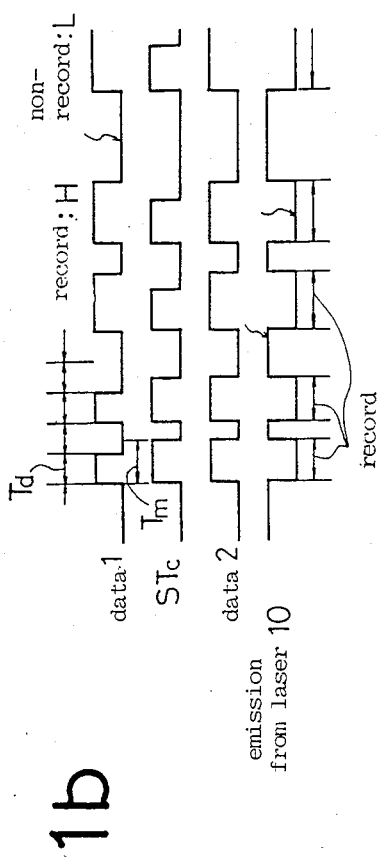

Referring to FIG. 1a, there is shown one embodiment of the invention. A laser 10 emits laser beam which is reflected by a multi-facet mirror 12 which is driven for rotation at a uniform rate. The laser beam is then passed through an f-θ lens 16 to impinge upon a mirror 14, which reflects the beam for reflection by another mirror 15. After being reflected by the mirror 15, the laser beam passes through a cylindrical lens 13 to irradiate a drum 17 which is formed from a photosensitive material. As the multi-facet mirror rotates, the laser beam repeatedly scans the surface of the drum in a direction parallel to the axis thereof (main scan X). It will be appreciated that the drum 17 is driven for rotation at a uniform rate (subscan Y).

While not shown, the surface of the drum 17 is uniformly charged by a charger, and the charged surface is scanned by the laser beam in the manner mentioned above. It will be noted that a laser driver 20 is connected to the laser 10, and during the scan by the laser beam, a beam sensor 18 disposed adjacent to one end of the drum 17 detects the presence of laser beam. A binary signal having a high or H logic level, representing a recording operation and a low or L logic level representing a non-record operation is applied to the laser driver 20 at a given time lag after the detection of the laser beam by the sensor 18 or when the scanning point of the laser beam reaches the beginning of a recording region. The laser driver 20 controls the emission of laser beam from the laser 10 in accordance with the recording signal. In the background exposure scheme, the high level H causes the emission of laser beam to be turned off while the low recording signal level L causes the emission of laser beam to be turned on.

The binary recording signal or data 1 which represents an image data is applied to a recorded dot width correction circuit 30 which is effective to correct the amount of exposure caused by the laser beam. It is to be understood that the circuit 30 operates to compare a binary signal associated to a picture element to be recorded or a picture element in question with binary signals associated with adjacent picture elements, and develops a corrected binary signal or data 2 depending on the correlation therebetween which is applied to the laser driver 20.

In this embodiment, the circuit 30 comprises a monostable multivibrator 31 having an input B to which data 1 is applied. When data 1 rises from its L (non-record) to its H (record) level, the multivibrator 31 is triggered to produce a signal STc having an H level during a time interval Tm and which then returns to its L level (non-record) level. In addition, the circuit 30 comprises an OR gate 33 which produces a logical sum of data 1 and the output STc from the multivibrator 31. The time interval Tm during which the multivibrator 31 develops the signal STc is determined by a resistor 32, which is shown as a variable resistor, thus permitting the length of Tm to be adjusted.

FIG. 1b graphically shows various signals appearing within the correction circuit 30. In this example, Tm has a length slightly longer than the time period Td of the binary signal or data 1 which is allocated to a single picture element. Suppose that data 1 associated with a picture element which immediately precedes the picture element in question has an L level(non-record) and data 1 associated with the picture element in question has an H level (record) while data 1 associated with a picture element which immediately follows the picture element in question in the direction of the main scan X has an L level (non-record) or that the picture element in question is black and is isolated from preceding and following picture elements which are white's as viewed in the direction of the main scan X. When data 1 changes from its L (for preceding picture element) to its H (picture element in question) level, the multivibrator 31 is triggered to develop an H output. During the dot period Td for the picture element in question, both data 1 and the output STc from the multivibrator 31 assume their H level, whereby OR gate 33 develops an H output as data 2, which indicates a record operation. After the dot period Td associated with the picture element in question has passed, the next dot period Td will be associated with the following picture element. However, while data 1 has an L level which is associated with the following picture element, the output STc from the multivibrator 31 remains to be at its H level until Tm passes, and accordingly the gate 33 continues to deliver the H output (indicating a record operation) as data 2. After Tm has passed, both data 1 and STc are L levels, and hence the gate 33 provides an L output (non-record operation) as data 2.

Alternatively, when the binary signal associated with the picture element in question and the binary signal associated with the immediately following picture element both have an H level (record), after the time period (Tm) allocated to the picture element in question has passed, there remains the H level associated with the following picture element, so that the extension time (Tm−Td) during which the record for the picture element in question is extended will be shared by the following picture element as well. It will be seen that when black's appear in succession in the direction of the main scan, there is no change from the L to the H level in data 1, and hence the multivibrator 31 cannot be triggered. This means that there is no extension time (Tm−Td) for the last one of the black picture elements.

It will be seen that the recorded dot width correction circuit 30 operates to increase the recording time for the picture element in question from Td to Tm only when the picture element in question has an H level (record) and is preceded by a picture element having an L level (non-record) and followed by another picture element having an L level (non-record) considering the distribution of blacks and white among binary information or data 1 associated with successive picture elements. It will also be noted that the extension of the recording time for the picture element in question substantially does not occur when the picture element in question and its preceding picture element both have an H level or when the picture element in question and a following picture element both have an H level. In this manner, the correction circuit 30 considers the correlation between recording information of picture elements which are adjacent to the picture element in question in the direction of the main scan X, by changing the recording time for the picture element in question to Tm when the picture element in question is to be recorded black and is isolated. It will be understood that when the recording time is changed to Tm, the recording time has been increased from Td to Tm, thus resulting in an increase in the width of the recorded dot by an amount corresponding to (Tm−Td).

It should be understood that the monostable multivibrator 31 serving as time limit means may be replaced by a delay circuit, for example, a shift register which is clocked by a clock having a period which is substantially reduced than Td. A time lag provided by the shift register is chosen to be equal to (Tm−Td). In this instance, the correlative comparison is changed. Specifically, in the above embodiment, the multivibrator 31 is triggered in response to a change from an L to an H level between the preceding picture element and the picture element in question. However, when the shift register is used, the recording time for the picture element in question is changed by the correlative comparison between the binary value of the picture element in question and that of the following picture element. Specifically, when the picture element in question has an H level while the following picture element has an L level, the recording time for the picture element in question is increased from Td to Tm, with the time delay (Tm−Td) being provided by the delay circuit. It is to be understood that the extension of the recording time occurs when the picture element in question which is to be recorded black is spaced from a subsequent black picture element.

Figure 2:
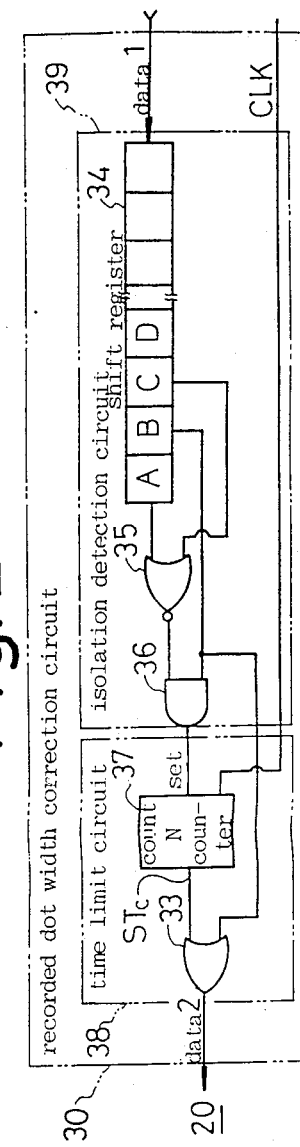
FIG. 2 is a block diagram of essential parts of another embodiment of the invention.

FIG. 2 shows essential parts of another embodiment of the invention where the recorded dot width correction circuit 30 comprises an isolation detection circuit 39 and a time limit circuit 38. The isolation detection circuit 39 comprises a shift register 34 in which binary recording signal or data 1 is latched, NOR gate 35 and AND gate 36. Representing a picture element in question by B, and a preceding picture element and a following picture element as viewed in the direction of the main scan X by A and C, respectively, the binary signals associated with these picture elements A and C are applied to the inputs of the gate 35. It will be seen that the gate 35 produces an H level output only when the both input signals are at L levels, indicating that the picture element in, question, is preceded and followed by a white element. The gate 36 develops an H level output (isolation detection signal) for application to the time limit circuit 38 when the gate 35 produces an H level output and the picture element in question B has an H level, or when the picture element in question of black level is isolated from the preceding and the following picture element.

The time limit circuit 38 comprises a count N counter 37, and OR gate 33. The isolation detection signal of H level enables the counter 37 to begin counting clock pulses CLK having a period which is shorter than Td, and to change its output STc from its L to its H level. When the count in the counter 37 reaches a value corresponding to Tm, it changes the output STc from its H level to its L level. The output STc from the counter 37 is applied to the gate 33 together with the binary signal associated with the picture element B in question, and the gate 33 provides an output which represents a logical sum of the both inputs.

With this arrangement, it will be understood that the recorded dot width correction circuit 30 shown in FIG. 2 operates to change the recording time for the picture element in question from Td to Tm only when the picture element in question is black and is isolated from preceding and following picture elements as viewed in the direction of the main scan X.

The counter 37 shown in FIG. 2 may be replaced by a delay circuit such as a shift register, for example, which provides a time lag of (Tm−Td). The same extension of recording time occurs with this modification.

Figure 3:
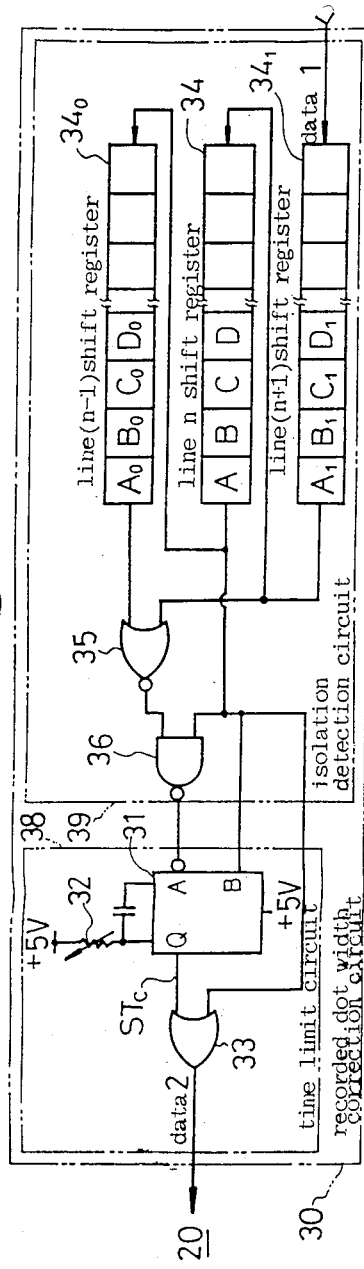
FIG. 3 is a block diagram of essential parts of a further embodiment of the invention.

FIG. 3 shows essential parts of a further embodiment of the invention where the recorded dot width correction circuit 30 comprises an isolation detection circuit 39 and a time limit circuit 38. In this embodiment, the isolation detection circuit 39 comprises three line shift registers $34_0$, 34 and $34_1$, each of which has the capacity to store binary recording information for one full line in the direction of the main scan X, in order to enable the correlation in the direction of subscan to be determined. In addition, the detection circuit 39 includes NOR gata 35 and NAND gate 36. Representing a picture element in question by A, the binary recording signals associated with picture elements $A_0$ and $A_1$ which are adjacent to the picture element A in question in the direction of subscan Y are applied to the gate 35, which therefore develops an H level output only when the both signals from the picture elements $A_0$ and $A_1$ have L levels, indicating that the picture element A is preceded and followed by white's in the direction of subscan. The binary signal associated with the picture element A and the output of the gate 35 are applied to the inputs of the gate 35, which therefore develops an L level signal only when the binary signal associated with the picture element A has an H level and the gate 35 delivers an H level output (indicating the picture element A is isolated in the direction of subscan). The L level signal from the gate 36 represents a detection signal that the picture element in question is isolated in the direction of the subscan Y.

The time limit circuit 38 comprises a monostable multivibrator 31 and OR gate 33. The multivibrator 31 has an input A which is connected to the output of the gate 36. The multivibrator 31 is triggered when the input A has an L level and when another input B changes from its L to its H level. The multivibrator 31 is not triggered when the input A assumes its H level. The input B is supplied with the binary signal associated with the picture element A in question. Accordingly, the multivibrator 31 is triggered when the output from the gate 36 is at its L level, indicating that the picture element in question is isolated in the direction of the subscan Y and when in the direction of the main scan X the binary recording signal of the immediately preceding picture element has an L level and the picture element A in question has a binary signal of H level. In other words, the multivibrator 31 is triggered only when the picture element A in question is isolated from its immediately adjacent picture elements $A_0$, $A_1$ in the direction of the subscan Y and is also isolated from the immediately preceding picture element in the direction of the main scan X. The binary signal associated with the picture element A is also applied to OR gate 33 together with the Q output of the multivibrator 31. Thus, the gate 33 delivers a binary recording signal or data 2 which increases the recording time for the picture element A in question from Td to Tm.

It will be readily understood that an isolation detection circuit which detects the isolation in the direction of main scan X may be combined with another isolation detection circuit which detects the isolation in the direction of subscan Y to provide a combined detection of isolation in the both directions X and Y. As mentioned previously, the recorded area per dot varies with the distribution of adjacent black picture elements around the picture element in question. Accordingly, it may be desirable in some instances to control the amount of laser radiation at multiple levels depending on the distribution of adjacent black picture elements in a more refined manner.

Figure 4B:
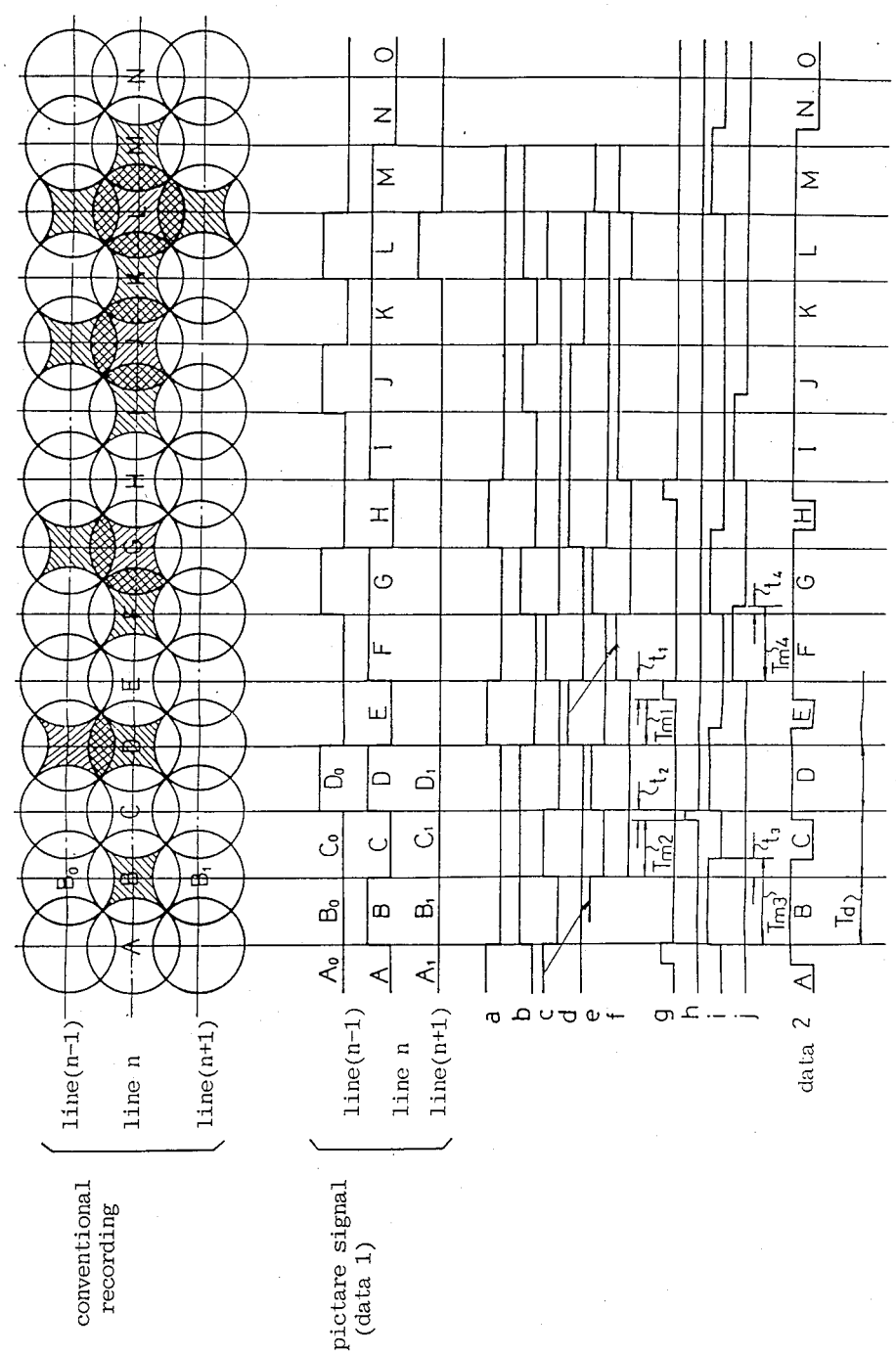
FIG. 4b graphically shows a series of timing charts ilustrating various signals appearing in a recorded dot width correction circuit shown in FIG. 4a, in comparison with dot patterns obtained according to the prior art.
Figure 9A:
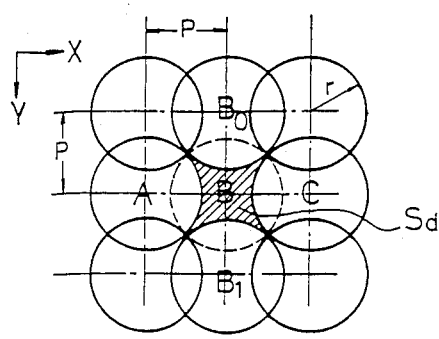
FIGS. 9a, 9b, 9c, 9d and 9e are enlarged plan views of several dot patterns which are produced by a laser printer of background exposure scheme.
Figure 9B:
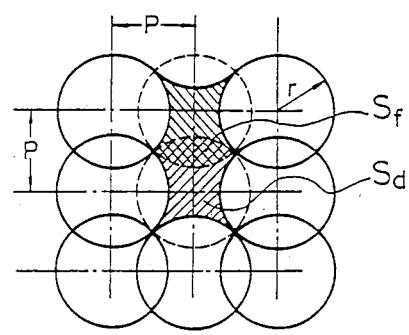
Figure 9C:
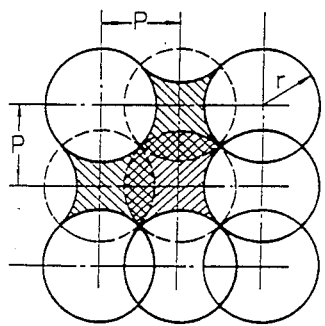
Figure 9D:
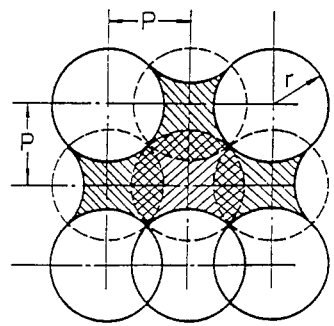
Figure 9F:
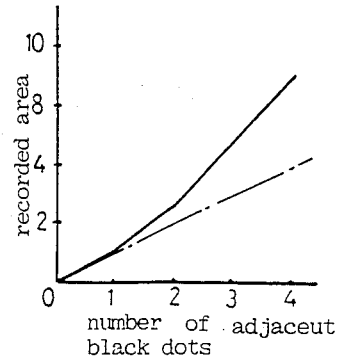
FIG. 9f graphically shows the recording response of the laser printer used in producing the dot patterns shown in FIGS. 9a to 9e.
Figure 9E:
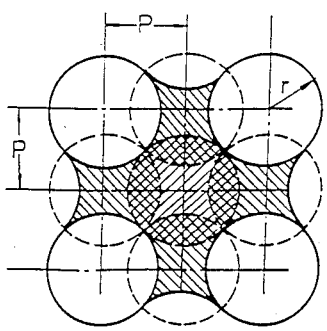

FIG. 4a shows essential parts of still another embodiment of the invention in which the recording time for the picture element in question is controlled at multiple levels in accordance with the distribution of adjacent black picture elements in both X and Y directions, and FIG. 4b shows various signals which appear at selected points within the arrangement. More specifically, the recording time for a picture element B in question, which is assumed to be recorded black, is controlled in a manner indicated in Table 1 below, in accordance with the distribution of adjacent picture elements A, $B_0$, C and $B_1$ (see FIG. 9a) which surround the picture element B.

TABLE 1

| adjacent picture elements | A | $B_0$ | C | $B_1$ | recording time of pixel B |
|---|---|---|---|---|---|
| information of pixel | L | L | L | L | $Td + t_1 + t_3$ |
| | H | L | L | L | $Td + t_2 + t_3$ |
| | L | H | L | L | $Td + t_2 + t_3$ |
| | L | L | H | L | $Td + t_1 + t_4$ |
| | L | L | L | H | $Td + t_1 + t_4$ |
| | H | H | L | L | $Td + t_3$ |
| | H | L | H | L | $Td + t_2 + t_4$ |
| | H | L | L | H | $Td + t_2 + t_4$ |
| | L | H | H | L | $Td + t_2 + t_4$ |
| | L | H | L | H | $Td + t_2 + t_4$ |
| | L | L | H | H | $Td + t_1$ |

TABLE 1-continued

| adjacent picture elements | | | | recording time |
|---|---|---|---|---|
| A | $B_0$ | C | $B_1$ | of pixel B |
| H | H | H | L | $Td + t_4$ |
| L | H | H | H | $Td + t_2$ |
| H | L | H | H | $Td + t_2$ |
| H | H | L | H | $Td + t_4$ |
| H | H | H | H | $Td$ |

In this table, H represents a record operation while L represents a non-record operation, and $t_1, t_3 > t_2, t_4$; $t_1 + t_3 \leq Tm$. The extension of the recording time as indicated by $t_1$ and $t_2$ takes place by reducing the recording time Td for the picture elements which procede the picture element in question. The extension of the recording time as indicated by $t_2$ and $t_4$ takes place by extending the recording time Td for the picture element in question.

Referring to FIG. 4a, a recorded dot width correction circuit 30 comprises an isolation detection circuit 39 which detects the isolation in two dimensions X and Y and a time limit circuit 38 which controls the recording time for the picture element in question (as indicated in Table 1) in accordance with the result of detection of isolation by the circuit 39.

The isolation detection circuit 39 comprises three line shift registers $34_0$, 34, $34_1$, each of which stores binary recording information or data 1 for one full line, NOR gates 40 and 43, exclusive OR gates 41 and 44, and a pair of latches 46 and 47 which provide a time delay of Td (one bit). In the description to follow, it is to be noted that a picture element in question is represented by B. The gate 40 operates to determine whether or not an adjacent picture element $B_0$, which precedes the picture element B by one line in the direction of subscan, and an adjacent picture element A which precedes the picture element B in the direction of main scan X, are both white's (L). It produces a signal a of H level only when both of these adjacent picture elements are white's. The exclusive OR gate 41 produces an output signal b of H level only when only one of these adjacent picture elements is white (L). Similarly, NOR gate 43 produces an output signal c of H level only when the picture element B is black (H) and when the following picture element C in the direction of main scan X and the following picture element $B_1$ in the direction of subscan Y are both white's (L). The signal c is delayed by Td by the delay circuit 46, which provides a signal e. Similarly, the exclusive OR gate 44 produces an output signal d of H level when the picture element B is black (H) and when only one of the following picture element C in the direction of main scan X and the following picture element $B_1$ in the direction of subscan Y is white (L). The signal d is delayed by Td by the delay circuit 47, which provides a signal f.

The time limit circuit 38 comprises four monostable multivibrators 48 to 51, a pair of AND gates 52 and 53 and OR gate 54. The multivibrator 48 is triggered when the output a from NOR gate 40 changes from its L to its H level, or when the binary signals associated with the picture elements A and $B_0$ have both changed to L levels (white's) when they were initially both H levels or only one of them was H level, thus changing its output from its H level to its L level. After a time interval of $Tm1 (= Td - t_1)$, the output reverts to its H level. Accordingly, AND gate 52 produces an output signal g of H level only during a time interval $t_1$ which immediately precedes the initiation of a recording of the picture element B when the picture element B has an H level and both picture elements A and $B_0$ have an L level.

The multivibrator 49 changes its output from its H to its L level by being triggered when the output b from the exclusive OR gate 41 changes from its L to its H level, or when the binary signals associated with the picture elements A and $B_0$ they had initially an H level both and then only one of them has changed to its L level (white). After a time interval $Tm2 (= Td - t_2)$. the output reverts to its H level. Accordingly, AND gate 53 produces an output signal h of H level only during a time interval $t_2$ which immediately precedes the initiation of a recording of the picture element B when the picture element B has an H level and only one of the picture elements A and $B_0$ has an L level.

Since the signal g or the signal h which assumes an H level only during the time interval $t_1$ or $t_2$ resides in a recording time associated with the picture element A which precedes the picture element B in question and is contiguous with the initiation of a recording of the picture element B, it will be appreciated that the recorded width of the picture element B is extended by extending the recording time into the recording time associated with the preceding picture element A, inasmuch as either signal g or h is developed only when the picture element A has an L level.

The multivibrator 50 is triggered to change its output from its L to its H level when the signal e changes from its L to its H level or during the recording time of the picture element B when it is being delivered to the OR gate 54 and when the binary signals associated with the picture elements $B_1$ and C have both changed to L levels (white's) when they were initially both H levels or only one H level. Subsequently it delivers a signal i of H level during a time interval $Tm3 (= Td + t_3)$ The multivibrator 51 is triggered when the signal f changes form its L to its H level, or when the picture element B is being delivered to OR gate 54 and when the binary signals associated with the picture elements $B_1$ and C have changed in a manner such that only one of them has an L level (white) when both of them initially had an H or an L level. The multivibrator 51 then delivers an output signal j of H level during a time interval $Tm4 (= Td + t_4)$ Since the signal i or the signal j which remains at its H level only during the time interval $t_3$ or $t_4$ resides in a recording time associated with the picture element C which is one picture element after the picture element B in question and is consecutive to the termination of a recording of the picture element B, and since the signal i or j at its H level is produced only when the picture element B has an H level, the recording width for the picture element B in question is increased by increasing it toward the picture element C which follows it.

The outputs g to j from the multivibrators 48 to 51 are passed through OR gate 54 to be applied to the laser driver 20 as the binary recording signal or data 2.

In this embodiment, when both picture elements $B_0$ and A which are adjacent to the picture element B in question are white's (L level), the recording time for the picture elemet B is extended by $t_1$ toward the picture element A. When only one of them is white (L level), the recording time for the picture element B is extended by $t_2$ toward the picture element A. In addition, when both picture elements C and $B_1$ which are adjacent to the picture element B in question are white's (L level), the recording time for the picture element B is extended by $t_3$ toward the picture element C, and when only one of them is white (L level), the recording time for the picture element B is extended by $t_4$ toward the picture element C.

Generally speaking, a square shown in FIG. 8a is chosen as the reference for the recorded area per dot in this embodiment. It is to be understood that the square has one side which is defined by the dot pitch P shown in FIGS. 9a and other Figures. In addition, $t_1$ corresponds to a recording time which increases the dot area by an amount $(Sf_1 + Sf_2)$ shown in FIG. 8a, $t_2$ corresponds to a recording time which increases the dot area by an amount $Sf_1(=Sf_2)$, $t_3$ corresponds to a recording time which increases the dot area by an amount $(Sf_3 + Sf_4)$ shown in FIG. 8a, and $t_4$ corresponds to the recording time which increases the dot area by an amount $Sf_3 (=Sf_4)$.

The described embodiments are used with a laser printer of the background exposure scheme. A modification which is necessary when applied to a laser printer of the image exposure scheme will now be described. As mentioned previously, in the background exposure scheme, the recorded area of an isolated dot is reduced (see FIG. 8a) in contrast to the image exposure scheme in which the recorded area of an isolated dot increases (see FIG. 8b). Accordingly, in the image exposure scheme, it is necessary that the recording time be reduced in proportion to the degree of isolation, in a manner contrary to that used in the background exposure scheme.

At this end, when the arrangement shown in FIG. 1a is modified for use in the image exposure scheme, the time limit Tm of the monostable multivibrator 31 is chosen less than Td, and OR gate 33 is replaced by AND gate. As a result, the recording time for a single black dot which is isolated in the direction of the main scan X will be equal to Tm.

Figure 5A:
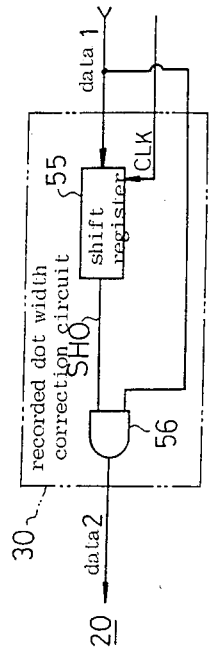
FIG. 5a is a block diagram of essential parts of an yet further embodiment of the invention.
Figure 5B:
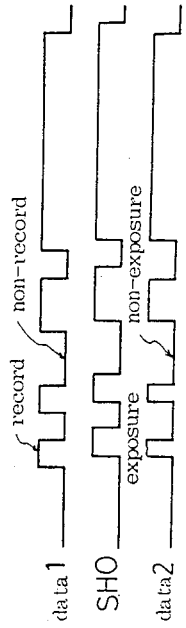

The monostable multivibrator may be replaced by a delay circuit. Such an example is shown in FIG. 5a, and its input and output are shown in FIG. 5b. A shift register 55 is clocked by a clock CLK which has a period less than Td, providing a time delay of Tm to data 1. A logical product of a delayed output SHO from the shift register 55 and data 1 is output from AND gate 56. This output is applied to the laser driver 20 which is used in the laser printer of the image exposure scheme. As shown in FIG. 5b, only when the preceding picture element in the direction of the main scan X is white, the recording time for the picture element in question which follows is reduced, the reduction in time being equal to Tm.

Figure 6:
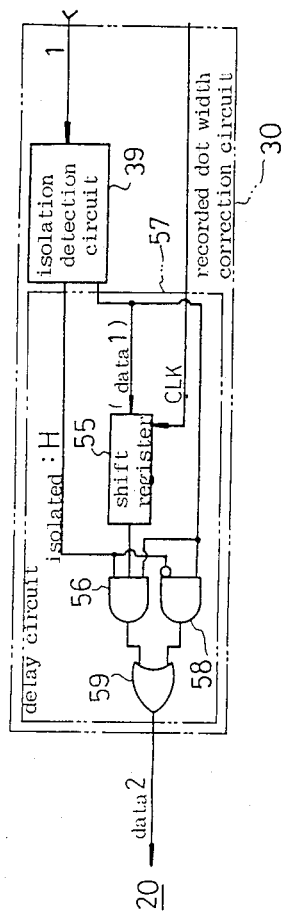
FIG. 6 is a block diagram of essential parts of still another embodiment of the invention.

FIG. 6 shows a modification of the isolation detection circuit shown in FIG. 2 when it is applied to the image exposure scheme. In this instance, in the isolation detection circuit 39, if the picture element B in question is isolated from its preceding picture element A and its following picture element C in the direction of the main scan X, an H level representing the isolation is applied to a delay circuit 57 together with the data (H level) of the picture element B. This enables AND gate 56, and a logical product of an output from a shift register 55 which provides a time delay of Tm and the H level representing the isolation of the picture element B is passed through OR gate 59 to be fed to the laser driver 20. When the H level representing the isolation is absent, AND gate 56 is disabled while the AND gate 58 is enabled, passing the signal associated with the picture element B directly as an output. Accordingly, when the picture element in question is isolated, its associated recording time will be (Td−Tm) while when it is not isolated, the recording time will be Td.

Figure 10A:
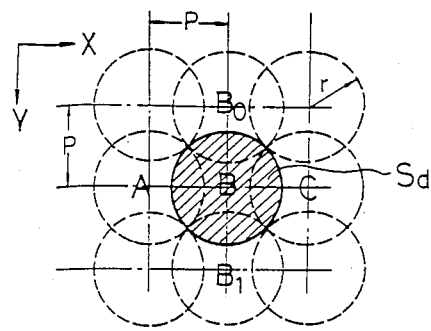
FIGS. 10a, 10b, 10c, 10d and 10e are enlarged views of several dot patterns which are produced with a laser printer of image exposure scheme.
Figure 10B:
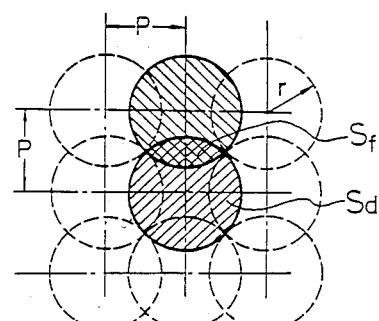
Figure 10C:
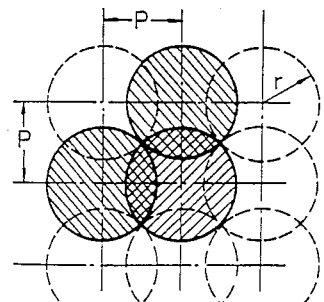
Figure 10D:
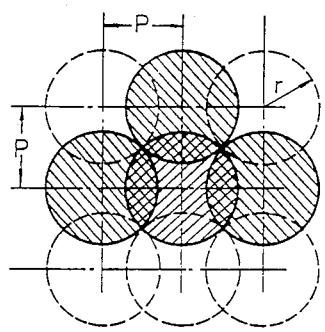
Figure 10F:
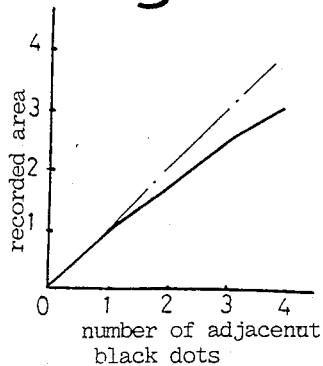
FIG. 10f graphically shows the recording response of the laser printer used in producing the dot patterns of FIGS. 10a to 10e.
Figure 10E:
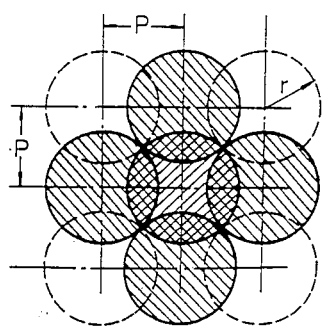

The determination of the isolation and the correction of the recording time can be effected in the image exposure scheme in the similar manner as illustrated in connection with the embodiment shown in FIG. 4a. Specifically, choosing the recorded area per dot to be a square shown in solid line in FIG. 8b having a side equal to a dot pitch P, and referring to FIG. 10a, a recording time for the picture element B in question is reduced by $(Sf_1 + Sf_2)$ when both adjacent picture elements $B_0$ and A are white's (L level), reduced by $Sf_1$ when only one of the adjacent picture elements is white, reduced by $(Sf_3 + Sf_4)$ when both adjacent picture elements C and $B_1$ are white's (L level), and reduced by $Sf_3$ when only one of these adjacent picture elements is white (L level). To achieve such modification, a pair of latches similar to the one bit delay latches 46 and 47 shown in FIG. 4a may be connected to the output of NOR gate 40 and to the output of the exclusive OR gate 41, respectively. Alternatively, the latches 46 and 47 may be omitted, and the time limit Tm3 of the multivibrator 50 is chosen equal to $(Td-t_3)$, the time limit Tm4 of the multivibrator 51 is chosen equal to $(Td-t_4)$ and the logical product of the output from the multivibrator 48 and the signal associated with the picture element B in question, the logical product of the output from the multivibrator 49 and the signal associated with the picture element B, the logical product of the output from the multivibrator 50 and the signal associated with the picture element B and the logical product of the output from the multivibrator 51 and the signal associated with the picture element B are applied to AND gate which is used in place of OR gate 54, the output of the AND gate driving the laser driver.

In the described embodiments, the recording time or recorded area per dot is corrected in accordance with the degree of isolation in either the background or image exposure scheme so that the recorded area ratio (recorded area/number of recorded dots) can be maintained nearly constant. However, the invention can be carried out by regulating the recording density in terms of the emission level from the laser being controlled.

This embodiment is schematically shown in FIG. 7 where an isolation detection circuit 39 supplies isolation information (either two-valued or multi-valued) and a binary recording signal (data 1) to a modulator 4. The modulator develops AO modulating voltage which corresponds to the isolation information for application to the deflecting electrode of the AO modulator 7. Thereupon, the transmission of the modulator 7 to laser beam changes in accordance with the isolation information to vary the emission level from the modulator 7 to provide a correction in the amount of exposure applied to a single dot. In this manner, a variation in the recording density per dot is minimized. By way of example, the isolation detection circuit shown in FIG. 4a may be used to develop modulation information, as indicated in Table 2 below for application to the modulator 4, in accordance with the binary recording signal associated with the picture element B is question and related signals a, b, c and d.

TABLE 2

| recording information (pixel B) | output from circuit 39 | | | | modulating information | modulating voltage | |
| --- | --- | --- | --- | --- | --- | --- | --- |
| | a | b | c | d | | image exposure | background exposure |
| H | H | L | H | L | 4 | $V_1$ | 0 |
| | H | L | L | H | 3 | $V_2$ | $V_1$ |
| | H | L | L | L | 2 | $V_3$ | $V_2$ |
| | L | H | H | L | 3 | $V_2$ | $V_1$ |
| | L | H | L | H | 2 | $V_3$ | $V_2$ |
| | L | H | L | L | 1 | $V_4$ | $V_3$ |
| | L | L | H | L | 2 | $V_3$ | $V_2$ |
| | L | L | L | H | 1 | $V_4$ | $V_3$ |
| | L | L | L | L | 0 | $V_5$ | $V_4$ |
| L | | | | | | 0 | $V_5$ |

Note: $V_4 > V_3 > V_2 > V_1 > 0$. The higher the voltage, the higher the emission level of laser beam. It is to be noted that the value of Vi differs depending on whether the background or the image exposurescheme is employed.

It will be appreciated that when the isolation detection circuit shown in FIGS. 2, 3 or 6 is used to provide a determination of whether or not the isolation occurs in terms of a two value, the corresponding modulating voltage will also be two-valued, or three-valued if the non-record operation 0 is included.

It will be understood from the foregoing that in accordance with the invention, when a picture element in question is to be recorded, the amount of exposure to laser beam which is applied to the picture element is corrected depending on whether adjacent picture elements are recorded or not recorded so as to bring the recorded area ratio (recorded area/the number of dots recorded) of the picture element in question close to a constant value. In this manner, the image quality of the record is improved, and a more smooth representation in halftones is enabled.

What is claimed is:

1. A laser printer employing a background exposure scheme, said laser printer comprising:
    a member having a photosensitive surface;
    a laser for producing a laser beam;
    means for causing said laser beam to scan said photosensitive surface in a main scanning direction and in a subscanning direction;
    means for receiving a binary recording signal, said signal operative in a plurality of first and second logic states of predetermined duration, said first state indicating that said laser beam should be turned on and said second state indicating that said laser beam should be turned off;
    means responsive to said binary recording signal for turning said laser beam on and off to expose selected portions of said photosensitive member; and
    correcting means responsive to a predetermined relationship between adjacent logic states of said binary recording signal for selectively correcting said binary recording signal by causing said laser to be turned on for a time period greater than the time period of said first state.

2. A laser printer according to claim 1 in which the correcting means comprises recorded dot width correcting means which changes the time duration of the binary recording signal associated with each picture element in accordance with the correlation between the binary recording signal associated with each picture element and binary recording signals associated with adjacent picture elements.

3. A laser printer according to claim 2 in which the recorded dot width correcting means compares the binary recording signal associated with each picture element with binary recording signals associated with those picture elements which are immediately adjacent to the first mentioned picture element in the main scanning direction of the laser, and changes the time duration fo the binary recording signal associated with each picture element in accordance with the correlation between the record or non-record operation required for the picture elements.

4. A laser printer according to claim 3, in which the recorded dot width correcting means comprises time limit means responsive to one of the two levels of the binary recording signal associated with each picture element which corresponds to a record or non-record operation, by initiating a timing operation and developing said one level during the time the timing operation is continued while developing the other level when the time limit means has timed out, and logic means for comparing the binary recording signal against a binary recording signal associated with a following picture element and for developing said one level during the time that both binary recording signals assume said one level.

5. A laser printer according to claim 2 in which the recorded dot width correcting means comprises delay means for delaying the binary recording signal associated with each picture element, and logic means for comparing the delayed binary recording signal against the original binary recording signal and continuing to output a signal representing a record operation as long as at least one of the recording signals represents a record operation.

6. A laser printer according to claim 2 in which the recorded dot width correcting means comprises delay means for delaying the binary recording signal associated with each picture element, and logic means comparing the delayed binary recording signal against the original binary recording signal and for outputting a signal representing a record operation only during the time the both recording signals represent a record operation.

7. A laser printer according to claim 3, in which the recorded dot width correcting means comprises correlation determination means for comparing the binary recording signal associated with each picture element with binary recording signals associated with picture elements which immediately precede and follow the first mentioned picture element in the main scanning direction of the laser and for specifying the time duration of the binary recording signal associated with each picture element in accordance with the correlation between a record and non-record operation indicated by the compared picture elements, and means for regulating the time duration of the binary recording signal associated with each picture element in a manner dependent on the specified time duration.

8. A laser printer according to claim 2 in which the correcting means comprises recorded dot width correcting means which compares the binary recording signal associated with each picture element against binary recording signals associated with those picture elements which are immediately adjacent to the first mentioned picture element in a direction perpendicular to the main scanning direction of the laser and changes the time duration of the binary recording signal associated with each picture element in accordance with the correlation between the record or non-record operation indicated by the compared picture elements.

9. A laser printer according to claim 8 in which the main scanning recorded dot width correcting means comprises correlation determination means for comparing the binary recording signal associated with each picture element against binary recording signals associated with those picture elements which immediately precede and follow the first mentioned picture element in direction perpendicular to the direction of the laser scan and for specifying a time duration for the binary recording signal associated with each picture element in accordance with the correlation between the record or non-record operation indicated by the compared picture elements, and means for regulating the time duration of the binary recording signal associated with each picture element in a manner dependent on the specified time duration.

10. A laser printer according to claim 2 in which the recorded dot width correcting means comprises correlation determination means for comparing the binary recording signal associated with each picture element against binary recording associated with those picture elements which are immediately adjacent to the first mentioned picture element in the main scanning direction of the laser and in a direction perpendicular to the main scanning direction of the laser, and for specifying a time duration for the binary recording signal associated with each picture element in accordance with the correlation between the record or non-record operation indicated by the compared picture elements, and means for regulating the time duration of the binary recording signal associated with each picture element in a manner dependent on the specified time duration.

11. A laser printer according to claim 2, in which the recorded dot width correcting means comprises correlation determination means for comparing the binary recording signal associated with each picture element against binary recording signals associated with those picture elements which immediately precede and follow the first mentioned picture element in the main scanning direction of the laser and also against binary recording signals associated with those picture elements which immediately precede and follow the first mentioned picture element in a direction perpendicular to the main scanning direction of the laser, and for specifying a time duration for the binary recording signal associated with each picture element, and means for regulating the time duration of the binary recording signal associated with each picture element in a manner dependent on the specified time duration.

12. A laser printer according to claim 1 in which the correcting means comprises determining means responsive to a binary recording signal associated with an adjacent picture element by developing level information which specifies a level at which a laser is to be modulated for each picture element, and an AO modulator for determining the emission level from the laser in accordance with the level information.

13. A laser printer according to claim 12 in which the determination means develops level information which is determined by binary recording signals associated with adjacent picture elements which immediately precede and follow each picture element in the main scanning of the laser direction.

14. A laser printer according to claim 12 in which the determination means develops level information which is determined by binary recording signals associated with adjacent picture elements which immediately precede and follow each picture element in a direction perpendicular to the main scanning direction of the laser scan.

15. A laser printer according to claim 12 in which the determination means develops level information which is determined by binary recording signals associated with picture elements which are immediately adjacent in the main scanning direction of the laser and by binary recording signals associated with picture elements which are imemdiately adjacent in a direction perpendicular to the main scanning direction of the laser.

16. The laser printer of claim 1 wherein said predetermined relationship is that said first state is preceded and followed by a second state within said binary signal.

17. A laser printer employing an image exposure technique, said laser printer comprising:
   a member having a photosensitive surface;
   a laser for producing a laser beam;
   means for causing said laser beam to scan said photosensitve surface in a main scanning direction and in a sub-scanning direction;
   means for receiving a binary recording signal, said signal operative in a plurality of first and second logic states of predetermined duration, said first state indicating that said laser beam should be turned on and said second state indicating that said laser beam should be turned off;
   means responsive to said binary recording signal for turning said laser beam on and off to expose selected portions of said photosensitive member; and
   correcting means responsive to a predetermined relationship between adjacent logic states of said binary recording signal for selectively correcting said binary recording signal by causing said laser to be turned on for a time period shorter than the time period of said first state.

18. The laser printer of claim 17, wherein said predetermined relationship is that said first state is preceded and followed by a second state within said binary signal.

19. A laser printer according to claim 17, in which the correcting means comprises recorded dot width correcting means which changes the time duration of the binary recording signal associated with each picture element in accordance with the correlation between the binary recording signal associated with each picture element and binary recording signals associated with adjacent picture elements.

20. A laser printer according to claim 19 in which the recorded dot width correcting means compares the binary recording signal associated with each picture element with binary recording signals associated with those picture elements which are immediately adjacent to the first mentioned picture element in the main scanning direction of the laser, and changes the time duration of the binary recording signal associated with each picture element in accordance with the corelation between the record or non-record operation required for the picture elements.

21. A laser printer according to claim 20, in which the recorded dot width correcting means comprises time limit means responsive to one of the two levels of the binary recording signal associated with each picture element which corresponds to a record or non-record operation, by initiating a timing operation and developing said one level during the time the timing operation is continued while developing the other level when the time limit means has timed out, and logic means for comparing the binary recording signal against a binary recording signal associated with a following picture element and for developing said one level during the time that both binary recording signals assume said one level.

22. A laser printer according to claim 19, in which the recorded dot width correcting means comrpises delay means for delaying the binary recording signal associated with each picture element, and logic means for comparing the delayed binary recording signal against the original binary recording signal and continuing to output a signal representing a record operation as long as at least one of the recording signals represents a record operation.

23. A laser printer according to claim 19, in which the recorded dot width correcting means comprises delay means for delaying the binary recording signal associated with each picture element, and logic means comparing the delayed binary recording signal against the original binary recording signal and for outputting a signal representing a record operation only during the time the both recording signals represent a record operation.

24. A laser printer according to claim 20, in which the recorded dot width correcting means comprises correlation determination means for comparing the binary recording signal associated with each picture element with binary recording signals associated with picture elements which immediately precede and follow the first mentioned picture element in the main scanning direction of the laser and for specifying the time duration of the binary recording signal associated with each picture element in accordance with the correlation between a record and non-record operation indicated by the compared picture elements, and means for regulating the time duration of the binary recording signal associated with each picture element in a manner dependent on the specified time duration.

25. A laser printer according to claim 19, in which the correcting means comprises recorded dot width correcting means which compares the binary recording signal associated with each picture element against binary recording signals associated with those picture elements which are immediately adjacent to the first mentioned picture element in a direction perpendicular to the main scanning direction of the laser and changes the time duration of the binary recording signal associated with each picture element in accordance with the correlation between the record or non-record operation indicated by the compared picture elements.

26. A laser printer according to claim 25, in which the recorded dot width correcting means comprises correlation determination means for comparing the binary recording signal associated with each picture element against binary recording signals associated with those picture elements which immediately precede and follow the first mentioned picture element in a direction perpendicular to the main scanning direction of the laser and for specifying a time duration for the binary recording signal associated with each picture element in accordance with the correlation between the record or non-record operation indicated by the compared picture elements, and means for regulating the time duration of the binary recording signal associated with each picture element in a manner dependent on a specified time duration.

27. A laser printer according to claim 19, in which the recorded dot width correcting means comprises correlation determination means for comparing the binary recording signal associated with each picture element against binary recording signals associated with those picture elements which are immediately adjacent to the first mentioned picture element in the main scanning direction of the laser and in a direction perpendicular to the main scanning direction of the laser, and for specifying a time duration for the binary recording signal associated with each picture element in accordance with the correlation between the record or non-record operation indicated by the compared picture elements, and means for regulating the time duration of the binary recording signal associated with each picture element in a manner dependent on the specified time duration.

28. A laser printer according to claim 19, in which the recorded dot width correcting means comprises correlation determination means for comparing the binary recording signal associated with each picture element against binary recording signals associated with those picture elements which immediately precede and follow the first mentioned picture element in the main scanning direction of the laser and also against binary recording signals associated with those picture elements which immediately precede and follow the first mentioned picture element in a direction perpendicular to the main scanning direction of the laser, and for specifying a time duration for the binary recording signal associated with each picture element, and means for regulating the time duration of the binary recording signal associated with each picture element in a manner dependent on the specified time duration.

29. A laser printer according to claim 7, in which the correcting means comprises determination means responsive to a binary recording signal associated with an adjacent picture element by developing level information which specifies a level at which a laser is to be modulated for each picture element, and an AO modulator for determining the emission level from the laser in accordance with the level information.

30. A laser printer according to claim 29, in which the determination means develops level information which is determined by binary recording signals associated with adjacent picture elements which immediately precede and follow each picture element in the main scanning direction of the laser.

31. A laser printer according to claim 29, in which the determination means develops level information which is determined by binary recording signals associated with adjacent picture elements which immediately precede and follow each picture element in a direction perpendicualr to the main scanning direction of the laser.

32. A laser printer according to claim 29, in which the determination means develops level information which is determined by binary recording signals associated with picture elements which are immediately adjacent in the main scanning direction of the laser and by binary recording signals associated with picture elements which are immediately adjacent in a direction perpendicular to the main scanning direction of the laser.

* * * * *